United States Patent Office

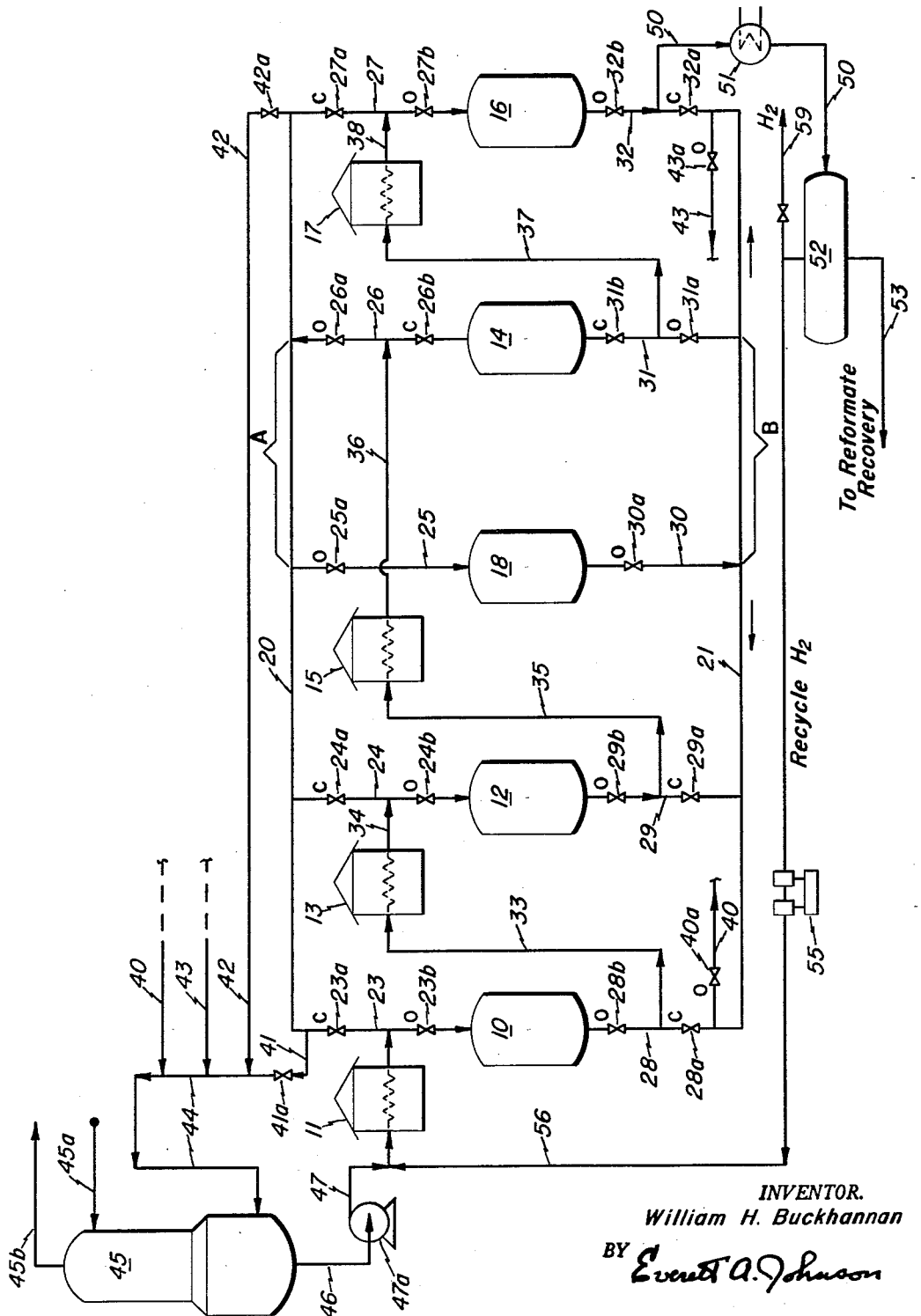
April 21, 1964 W. H. BUCKHANNAN 3,130,145
METHOD OF PREVENTING OCTANE LOSS IN A REFORMING SYSTEM
Filed Oct. 6, 1961
INVENTOR.
William H. Buckhannan
BY Everett A. Johnson
ATTORNEY

3,130,145
Patented Apr. 21, 1964

3,130,145
METHOD OF PREVENTING OCTANE LOSS
IN A REFORMING SYSTEM
William H. Buckhannan, Manhattan, Kans., assignor to Standard Oil Company, Chicago, Ill., a corporation of Indiana
Filed Oct. 6, 1961, Ser. No. 143,390
1 Claim. (Cl. 208—65)

This invention relates to an improved regenerative platinum-on-alumina hydrocarbon conversion system for reforming naphtha.

Supported platinum catalysts, e.g., platinum-on-alumina catalyst, are used extensively in a conversion of hydrocarbons, particularly in the hydroforming of petroleum naphthas to increase the octane numbers thereof. In a typical reforming system, a mixture of petroleum naphtha and hydrogen-containing gas is passed through a bed of platinum-alumina catalyst containing between about 0.05 and 1 percent by weight of platinum, at a temperature in the range of about 850 to 1050° F., elevated pressure, i.e. a pressure between about 50 and 1000 pounds per square inch, a hydrogen rate in the range of about 1,000 to 10,000 standard cubic feet per barrel of charging stock, and an hourly weight space velocity between about 0.5 and 10. Under such conditions the catalytic properties of platinum catalyst gradually decline over a period of time as a result of carbon deposits and/or other physical and chemical changes in the platinum and/or supporting materials.

In order to realize the maximum benefit with a reformer of this type, frequent regeneration of individual reactors is required. The reactors are on-stream for a relatively long time period of twenty-four to forty-eight hours or more and do not necessarily undergo regeneration in any particular sequence. The regeneration cycle normally requires an inert gas purging operation followed by carbon burn-off with a dilute oxygen containing gas, e.g. about 2 percent oxygen, to prevent undue temperature rise at a relatively moderate temperature in the range of about 700° to 900° F. for a period of time sufficient to restore the catalyst to the original activity level or higher.

In my system I provide multiple reactors and will describe it by reference to five reactors of which at least four are primary or on-stream reactors and one is an alternate or swinging reactor. The system further includes a charging stock heater and three re-heaters, connecting lines and valves for passing charging stock through the charging stock heater, a first on-stream reactor, the first re-heater, a second on-stream reactor, the second re-heater, a third on-stream reactor, the third re-heater, and a fourth on-stream reactor, while the alternate or "swing" reactor is undergoing regeneration.

In a process of this type, the final reactor may be alternately on-stream and regenerated for several cycles before it is necessary to cut out the preceding on-stream reactor for regeneration and a prior on-stream reactor may require even less frequent regeneration than the following on-stream reactor. In a typical situation with five reactors, the sequences of regenerations on the reactors may be fourth, third, swing; fourth, third, second, swing; fourth, third, swing; fourth, third, second, first, swing; etc.

The reactant flow through the system is always in series: first reactor, first-heater, second reactor, second re-heater, third reactor, etc. The swing or alternate reactor, after itself has been regenerated, merely takes the place of one of the on-stream reactors when the other reactor is off-stream for regeneration.

An arrangement of connecting process piping and valves referred to as upper and lower swing headers are provided for substituting the alternate reactor for any one of the on-stream reactors when one of the latter requires regeneration. Commercial experience indicates the need to keep the swing headers warm and should be at a temperature which is within about 300° F. of process temperatures. It is desirable to keep the headers hot so as to avoid thermal shock to and failure of these lines.

Heretofore, the swing headers have been heated by bypassing a portion of the hot reformer feed through the headers and then to product reformate recovery. In doing so, the bypassed portion of the feed does not pass through all the reforming reactors but does appear in the reformate product and there is a resulting loss in octane. Such loss in octane has been found to amount to at least 0.5 O.N. and as much as 0.6 to 0.9 O.N. on the total reformate. Expressed in terms of gasoline yields, if it is desired to achieve 96 octane then a major portion of the feed must be reformed to 97 octane because of the bypassing of the low octane charging material to heat the headers; and about 1% in gasoline yield is lost because of the higher severity.

In view of such octane penalties, bypassing the feed to warm the swing headers is uneconomical and undesirable. It is with respect to this problem that this invention relates.

In accordance with my invention, the temperature of the connecting piping (commonly called swing headers) is controlled by recycle of a portion of the process flow to the reactor charge stripper to provide the required heat for warming of the process lines, thus eliminating the bypass use of the total reactor charge and increasing the octane number of the reformate.

The accompanying drawing, which forms a part of this specification, is a simplified process flow diagram embodying means whereby the swing reactor headers are heated by diverting a portion of the process flow for return to the reactor charge stripper where it is absorbed by the liquid feed flowing down the stripper. The flow of the process fluid back to the stripper provides warm-up heat for those sections of the swing leaders which would otherwise see no flow of hot process material during the regeneration of a selected reactor.

Referring to the drawing, five reactors 10, 12, 14, 16, and 18, are provided, of which at least four are on-stream and one (18) is an alternate or swing reactor. An arrangement of connecting lines and valves is provided for use with swing headers 20 and 21 for substituting the alternate reactor 18 for any one of the on-stream reactors 10, 12, 14, and 16, when any of the latter requires regeneration.

Although two or more of the reactors are always connected for series flow operation, the alternate reactor 18 may be connected for parallel operation with a selected one of the reactors in such series. The connection for parallel operation is advantageous since the alternate reactor 18 may actually be operated in parallel with any selected reactor 10, 12, 14, or 16, in the series at such times that none of the reactors require regeneration. Systems of this type are described for example in U.S. 2,773,014 and 2,853,436, and will not be described in more detail here.

The unit also includes a charging stock heater 11 and three re-heaters 13, 15, and 17, together with the necessary connecting lines and valves (to be further identified and described below) for passing charging stock through the on-stream reactors 10, 12, 16, and 18, in the illustrated embodiment.

The reactant flow through the system is always in the series: first reactor 10, first re-heater 13, second reactor 12, second re-heater 15, third reactor 14, etc. The alternate reactor 18 merely takes the place of one of the on-stream reactors when this is necessary or desirable. In the drawing, the system is illustrated wherein third reactor 14, is undergoing regeneration.

The upper swing header 20 is connected to reactors 10, 12, 18, 14, and 16, by means of valved lines 23, 24, 25, 26, and 27, containing the indicated valves. The lower swing header 21 is connected to reactors 10, 12, 18, 14, and 16, by valved lines 28, 29, 30, 31, and 32. The re-heaters 13, 15, and 17, are respectively provided with inlet line 33, transfer line 34, inlet line 35, transfer line 36, inlet line 37, and transfer line 38.

Warm-up facilities for the swing headers 20 and 21 include valved recycle lines 40, 41, 42, and 43, lines 40 and 41 communicating with opposite ends with the upper header 20 and lines 42 and 43 communicating with opposite ends of lower swing header 21. All four lines, 40, 41, 42, and 43 discharge into stripper recycle line 44.

Typically, the stripper recycle line 44 may be about 2″ I.D. with recycle lines 40 to 43 inclusive being about 1″ I.D., whereas the swing headers 20 and 21 are from about 10 to 12″ in diameter.

The recycled process fluids in stripper recycle line 44 discharges into the stripper 45 may be operated at about 150 p.s.i. and elevated temperature in a conventional manner. However, hot process fluid recycle as disclosed reduces the heat requirements on the stripper. Reactor charge is introduced via line 45a and stripper over-head products are removed via line 45b. Stripped reactor charge is withdrawn via line 46 from the stripper 45 and charged by line 47 into the pre-heat furnace 11, pump 47a being provided to raise the pressure to between about 500 and 600 p.s.i.

The recycled process material flows through and from bypassed sections A and B of the upper and lower swing headers, only a minor portion of such process flow material being diverted through the indicated sections A and B but in an amount sufficient to maintain the desired temperature. This is accomplished by adjusting the respective flows through the recycle lines.

For the arrangement shown in the drawings, the naphtha plus recycle hydrogen feed is passed in series through the on-stream reactors 10, 12, 18, and 16, by-passing reactor 14 which is undergoing regeneration. Valves 23a and 28a, 24a and 29a, 26b and 31b, and 27a and 32a remain closed whereas the other valves in the conduits communicating with the top and bottom of the reactors and swing headers remain open. Valves 40a, 41a, 42a, and 43a in the recycle lines 40 to 43, respectively, are adjusted to provide the desired flow from the ends of the headers 20 and 21 to maintain the temperature.

When the swing reactor 18 is being regenerated and hence offstream, the valves 23a and 28a at the top and bottom of the reactor 10 are opened and the valves 40a and 41a in recycle lines 40 and 41 are opened, whereas valves 25a and 30a are closed. Lines 42 and 43 with open valves 42a and 43a recycle the diverted process fluid to recycle manifold line 44 as described herein.

The naphtha-hydrogen charge in line 47 flows through the unit by passing through valve 23b, reactor 10, valve 28b; inlet line 33, reheat furnace 13, transfer line 34; valve 24b, reactor 12, valve 29b; inlet line 35, second re-heater 15, transfer line 36; valve 26a, a section B of upper swing header 20; valved line 25, reactor 18, valved line 30a; a section of the lower swing header 21, valve 31a; inlet line 37, third re-heater 17, transfer line 38; valve 27b, and tail reactor 16.

The effluent from the tail reactor 16, at a temperature of at least about 900° F., is withdrawn through line 50 and heat exchanger 51 to separator 52 wherein hydrogen is separated from condensed hydrocarbons at a temperature not substantially higher than 100° F. The condensed hydrocarbons are withdrawn through line 53 to any known type of product recovery system (not shown). The net hydrogen produced is withdrawn through line 54, usually to a suitable absorber for recovering hydrocarbons therefrom. The remainder of the hydrogen is recycled by compressor 55, through recycle line 56, to the furnace 11.

Although the invention has been described by reference to certain embodiments thereof, this has been by way of illustration only, and it is contemplated that modifications may be made therein by those skilled in the art without departing from the spirit of the invention.

What I claim is:

In a regenerative catalytic reforming system for upgrading naphtha feed to high octane levels said system including multiple process reactors and a swing reactor, said process reactors and said swing reactor being connected by swing headers which direct process flow during regeneration in such a way as to bypass the reactor being regenerated whereby portions of the swing headers become empty and cool, the improvement which comprises flowing a minor portion of process fluids including naphtha vapors and hydrogen through said portions of said swing headers and returning said diverted process fluids from said bypassed portions into said process stream prior to said swing reactor whereby temperature is continuously maintained in said swing headers to prevent thermal shock when said headers are brought into contact with naphtha and octane level loss in the product is prevented by returning said diverted process fluids for further processing.

References Cited in the file of this patent

UNITED STATES PATENTS 2,952,611     Haxton et al.            Sept. 13, 1960